Nov. 1, 1927.  
H. G. MOORE  
1,647,187  
JUNCTION BOX FOR PORTABLE LIGHTS  
Original Filed Jan. 24, 1923    2 Sheets-Sheet 1
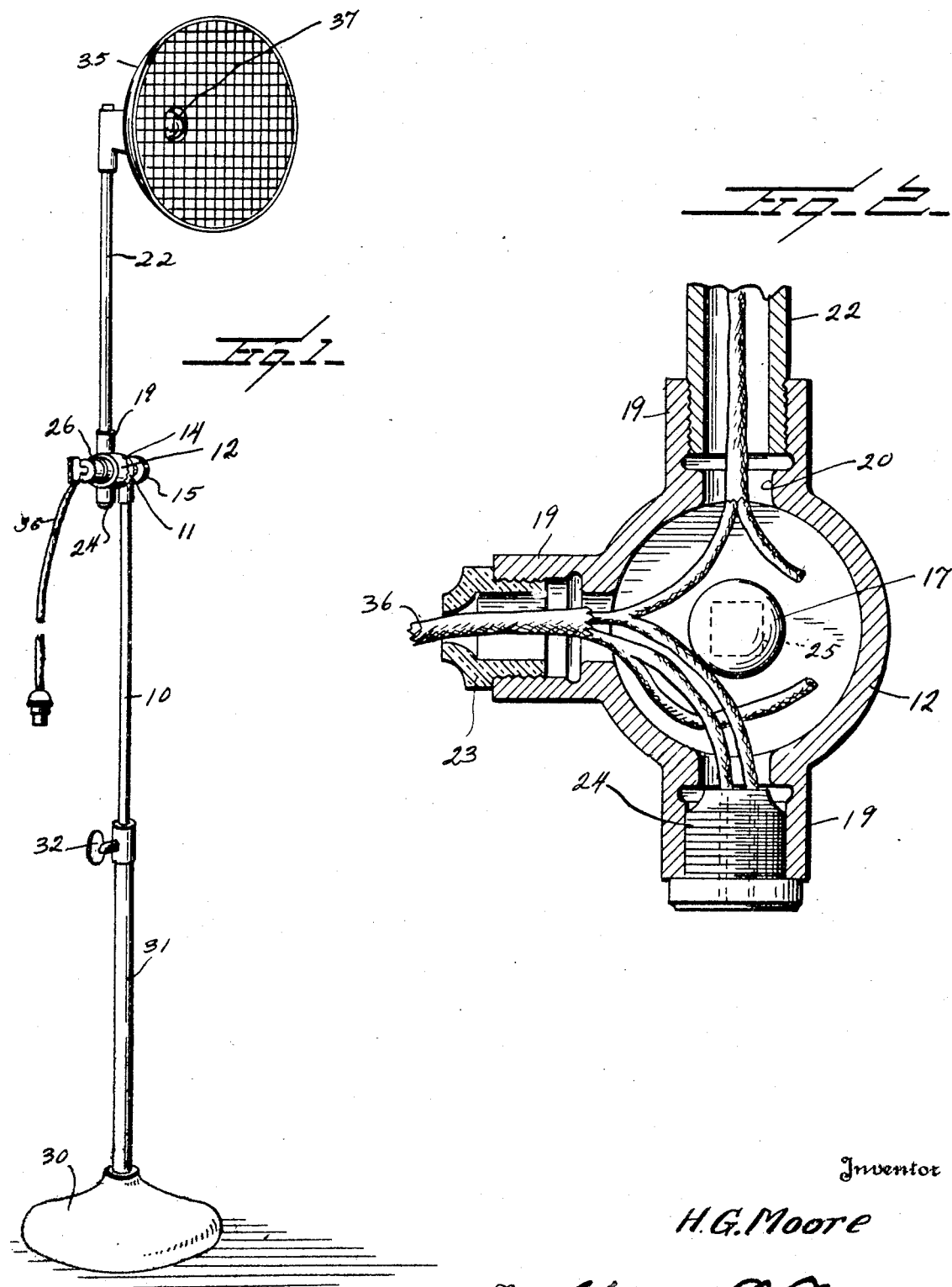
Inventor  
H. G. Moore  
By Watson E. Coleman  
Attorney

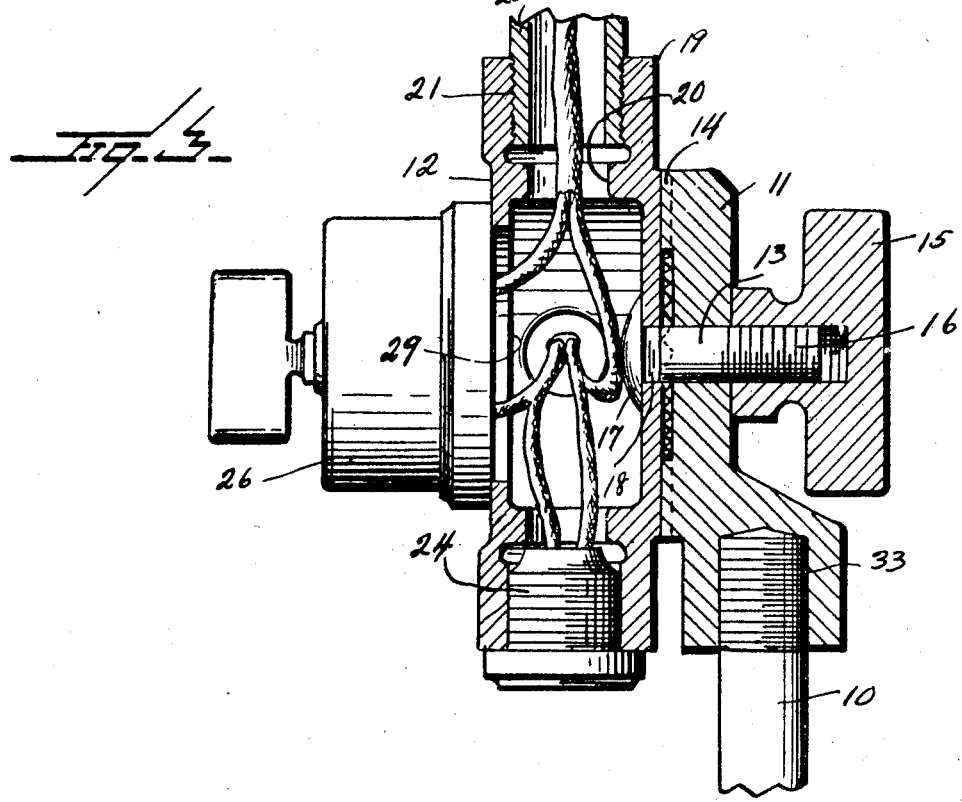
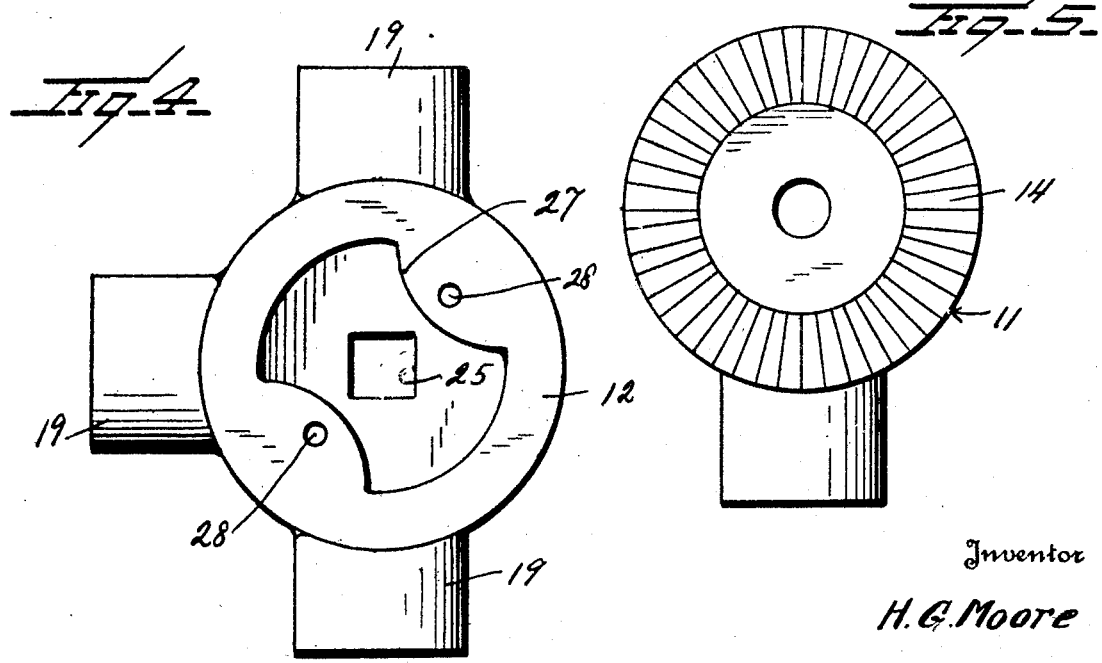

Patented Nov. 1, 1927.

1,647,187

UNITED STATES PATENT OFFICE.

HARVEY GREAR MOORE, OF BUFFALO, NEW YORK.

JUNCTION BOX FOR PORTABLE LIGHTS.

Application filed January 24, 1923, Serial No. 614,627. Renewed January 13, 1927.

This invention relates to portable lights, and more particularly to a junction box.

An important object of the invention is to provide a device of this character which provides for adjustability of the connected sections of the standard and which at the same time permits of the mounting of the switch by means of which the light may be controlled.

A further object of the invention is to provide a junction box of this character having a relatively stationary part and a rotating part upon which the switch is adapted to be mounted, the parts being connected by a pivot bolt insertible through the rotating part and engaged by a clamping nut at the remote face of the stationary part.

A still further object of the invention is to provide a device of this character having a plurality of outlets so that if so desired attachment plugs may be provided by means of which portable drills or the like may be connected to the same source as the light of the standard.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a perspective view of a lamp embodying a junction box constructed in accordance with my invention;

Figure 2 is an enlarged vertical sectional view through the junction box;

Figure 3 is a vertical sectional view taken at right angles to that shown in Figure 2;

Figure 4 is a front elevation of the junction box with the switch detached; and

Figure 5 is a front elevation of the junction box mounting.

Referring now more particularly to the drawings, the numeral 10 indicates a standard of any suitable construction, 11 a junction box mounting, 12 a junction box and 13 the pivotal connection between the junction box mounting 11 and junction box 12. The junction box and its mounting are provided upon adjacent faces thereof with coacting serrated portions 14 which may be forced into engagement with one another by means of a clamping nut 15 engaged with the outer end of the pivot member 13 which is threaded, as indicated at 16. The pivot bolt is preferably in the form of a carriage bolt, the head 17 of which is disposed interiorly of the junction box and the squared portion 18 of which is disposed within a similarly shaped aperture formed in the wall of the junction box.

The junction box 12 is in the form of a hollow circular casting having a plurality of hollow radial extensions 19, the bores 20 of which communicate with the hollow interior of the junction box. The outer ends of these bores are screw-threaded, as indicated at 21, for engagement with a conduit 22, a housing 23 or a plug 24, as may be desired, in the present instance one each of these elements being shown as engaged with the extensions in Figure 2. That wall of the junction box remote from that having the squared opening 25 receiving the shank of the pivot bolt 13 forms a seat for a switch 26 of any suitable construction, the wall embodying flanged portions 27 having apertures 28 therein adapted for the reception of securing elements 29 by means of which the switch is secured in position.

In Figure 1 I have illustrated a lamp embodying a junction box and mounting therefor constructed in accordance with my invention. This lamp comprises a base 30 from which a tubular standard 31 extends having telescopically mounted therein the support 10 which may be held in adjusted position by means of a clamping screw 32. The upper end of this support is engaged in a threaded socket 33 formed on the mounting 11 and in one of the radial extensions 19 of the junction box a conduit 22 is engaged which forms a support for a reflector and lamp housing 35. An extension cord 36 is entered through the housing 23 engaged in a second radial extension 19 and the leads are connected both with the switch 26 and plug 24. One of the leads is connected with the socket 37 of the lamp directly and the other of these leads is connected through the switch. With the lamp connected as described, the plug may be employed as a source of power at any time and by operation of the switch, the light may be governed. At the same time the construction of the junction box is such that the upper section of the light standard may be rotated to any desired position and locked in such position without in any manner disturbing the wiring within the junction box.

While I have described the junction box support and junction box as separate and distinct devices, it will be understood that these devices are in reality an inseparable combination, being each necessary to the other and combining to form a junction box, the parts of which are adjustable to provide for rotation. It will furthermore be obvious that the structural details hereinbefore set forth are capable of some change and modification without materially departing from the spirit of my invention and I accordingly do not limit myself to such specific structure except as hereinafter claimed.

I claim:—

1. A junction box comprising a mounting section and a box section, the box section having one side thereof open, means extending through the other side and engaging the mounting section, rotatably connecting the box section and mounting section, means for locking the sections against rotative movement and a switch closing the open side of the box section.

2. A junction box comprising a mounting section and a box section having one wall thereof open and adapted for the reception of a switch and being provided in the opposite wall with a centrally disposed squared opening, a bolt having its head abutting the last named wall and having a squared shank engaged in said squared opening, the body portion of said bolt being rotatably engaged with said mounting section and having its end portion threaded, and a clamping nut engaged with such end portion and abutting the mounting section.

3. A junction box comprising a mounting section and a box section having one wall thereof open and adapted for the reception of a switch and being provided in the opposite wall with a centrally disposed squared opening, a bolt having its head abutting the last named wall and having a squared shank engaged in said squared opening, the body portion of said bolt being rotatably engaged with said mounting section and having its end portion threaded, and a clamping nut engaged with such end portion and abutting the mounting section, the abutting walls of said sections being provided with coacting serrations locking the sections against relative rotative movement when the sections are fully engaged, the box being provided in the walls thereof with a plurality of radial outlets each threaded for engagement with a box adjunct.

In testimony whereof I hereunto affix my signature.

HARVEY GREAR MOORE.